United States Patent [19]

Burns et al.

[11] Patent Number: 4,768,466

[45] Date of Patent: Sep. 6, 1988

[54] NEST BOXES

[76] Inventors: Gerard C. Burns, The Lodge, Lotherton Hall, Aberford, Nr. Leeds; Francis J. Burns, 31 Braemar Drive, East Garforth, Leeds 25, both of England

[21] Appl. No.: 921,127

[22] Filed: Oct. 21, 1986

[30] Foreign Application Priority Data

Nov. 7, 1985 [GB] United Kingdom ............... 8527512

[51] Int. Cl.$^4$ ............................................. A01K 31/00
[52] U.S. Cl. .................................................... 119/23
[58] Field of Search .................... 119/23; 24/3 F, 3 J, 24/3 L, 10 R, 11 R, 11 F, 11 FE, 11 PP, 11 CT

[56] References Cited

U.S. PATENT DOCUMENTS

| 743,399 | 11/1903 | Seebold | 24/11 FE |
|---|---|---|---|
| 2,077,208 | 4/1937 | Brady | 119/23 |
| 3,387,341 | 6/1968 | Mates et al. | 24/10 R |
| 3,769,663 | 11/1973 | Perl | 24/3 J |

FOREIGN PATENT DOCUMENTS 0382576 10/1932 United Kingdom ............ 24/11 PP

Primary Examiner—Paul J. Hirsch
Assistant Examiner—J. M. Britt
Attorney, Agent, or Firm—Fred Philpitt

[57] ABSTRACT

The invention relates to nest boxes for birds or animals and proposes that the nest boxes comprise a sleeve with a body rotatable therein. The sleeve and body are in plastics material, and the sleeve has a cut-away portion while the body has bird or animal access apertures therein. The body can be rotated inside the sleeve to bring any one of several apertures into register with the cut-away portion so that the box can be adapted for the accommodation of different sized birds or animals. The invention also provides a C-shaped plastics material clip which is to be used for mounting the nest boxes, the clip being of resilient material such as plastics so that it can be sprung over a tree branch or a tree trunk or for example a fall pipe on a building. This clip may be of thicker material at the portion opposite the slot for reinforcing purposes and may be attached to a conventional nest box or to a nest box according to the invention.

11 Claims, 2 Drawing Sheets

NEST BOXES

This invention relates to nest boxes, of the type suitable for use mainly by the small and medium sized cavity nesting birds.

The use of nest boxes is now well established, but their importance continues to increase because of the progressive reduction of natural nesting environments for the small and medium size birds due to urban technological expansions. The erosion, destruction and removal of cavity nesting birds habitat has caused alarm amongst conservationalists and indeed public opinion is now a strong voice in the preservation of habitats for animals and birds.

The utilization of the nesting box for birds therefore is important and there is a demand for providing effective and efficient nesting boxes on a commercial scale.

Nesting boxes are used in domestic gardens and on domestic dwellings for the dual purposes of providing habitat for birds, and on the other hand for providing pleasure for the dwelling occupiers. On the other hand, conservationalists have used nesting boxes in large numbers in protected woodland areas entirely for conservationalist purposes. Also, ornothologists have designed specific nesting boxes for the purposes of observing specific birds.

Generally speaking, nesting boxes for cavity nesting birds have been fabricated by hand mainly from timber, planks, poles, bark and the like and are in a form which does not lend itself to mass production. The method of fabrication has limited the commercialization of the nesting boxes, and although some special designs have been proposed and patented, such as disclosed in U.S. Pat. No. 4,033,296 by and large the traditional hand made nesting box is still the most widely used type.

There has been suggestion that nesting boxes could be made of metals or plastics material, but certainly metal boxes have disadvantages in that the interior thereof becomes excessively hot if the boxes are exposed to the sun and the interior can also become wet and damp due to condensation. They also are rather cold and are not suitable for service as winter roosts for the birds. There is very little information on work done in connection with plastics material boxes, but certainly plastics material does not have the same disadvantages as metal boxes but the large cost of manufacturing moulds to produce moulded plastics boxes could be a limiting factor unless very large numbers of boxes are produced.

The present invention envisages the use of plastics material for nest boxes as a preferred form, but as will be clear from the following the invention is not to be considered as being limited to nest boxes of plastics material as the invention resides in the design and construction features of the nest boxes.

Conventional nest boxes fall into various categories, depending upon the birds for which they are designed. There is a wide range of types of nest boxes, but those which are directly comparable with the nest boxes according to the invention might be summarized generally as the following.

1. Nest boxes for hole nesters (small).
2. Nest boxes for hole nesters (large).
3. Open fronted nest boxes (small and large).
4. Nest boxes for crevice nesters.

The nest boxes for types 1 and 2 comprise simply boxes having hollow interiors and one wall having an access hole, the size of the hole being related to the size of bird which is to use the box. Typically, the small hole nesters are the members of the tit family, wren, house sparrow, tree sparrow and various other species, whilst the larger hole nesters include the great tit and the starling. The most popular crevice nester bird is the tree creeper and a special wedge nest box has been designed and produced for this bird.

The open fronted box may be used by the fly catcher, wagtail, redstar, wren and various others.

The nest box for the crevice nesting bird is a box provided with a slot through which the bird can enter and leave the nest box, whilst the open fronted box is exactly as described, i.e. it is a box with a substantially open front for the entry and exit of the bird.

Nest boxes desirably should have some design features to accommodate the bird's nesting habits and migratory habits, becuse it is important that after a nesting box has been used and the birds have fled the nest, the nest should be capable of being thoroughly cleaned for re-use at a later date. In general birds will not re-use a nesting box unless the previous nest materials have been removed.

Additionally, it is important that the nest box should be designed to be substantially robust against predators such as crows and hawks and woodpeckers, and against animals such as foxes and squirrels.

It is furthermore useful if the box is controllable in a simple manner in order to ensure that it is made available only at the correct time of year for a particular species of bird. For example the box should be adjusted so that it cannot be used in a nesting period say of a species of local bird which it is desired to keep out of the box, but can be made available in another nesting period for a migrant bird.

It is also desirable that the method of application of the nesting box to its mounting, usually a tree should be as efficient as possible taking into account that forestry commissioners will frown upon the use of nails and metallic objects for attachment as these can cause destruction and danger if struck for example by power saws or the like. Some attachment methods comprise the use of wire and leather straps but these are not satisfactory insofar as leather does not last long enough, and wire straps may rust through or in time become embedded the the bark of the tree. In some instances a suspension cord or wire has been used but this does not provide for the best form of mounting as the nest will then be freely swinging, and in a more elaborate arrangement timber pegs have been used similar to nails especially where the box is attached to a valuable tree. The use of timber nails is of course a time consuming and expensive method of attachment.

The present invention in fact revolutionises nest box design and also nest box attachment and provides by the design such a collection of desirable features including that the nest box is sufficiently attractive to be produced in plastics material and in large numbers. The advantages and desirable features of the invention will now be explained.

In accordance with the first aspect of the invention the nest box comprises basically an outer sleeve containing a hollow body therein, the body being rotatable within the sleeve and the sleeve having a portion removed so that a bird access aperture can be moved into registry with the removed portion to permit the bird to gain access to the interior of the body.

The body will typically be otherwise closed except for perhaps some drain aperture means at the bottom thereof, and it may have a cap which closes the top end, but which is removable for the purpose of gaining access to the interior of the body. The cap preferably will have ventilation apertures.

The sleeve may suitably be in the form of a curved member of C-shaped section so that the cut-away portion is in fact a wide slot.

The body may have several bird access apertures therein, each of which can be registered with the slot in the sleeve by rotating the body, and typically these apertures comprise a first cylindrical hole towards the top end of the body of small diameter, for small hole nesting birds, and a second and larger circular hole for larger hole nesting birds. A third aperture may comprise a wide generally rectangular aperture of approximately the same width as the slot in the sleeve for the birds who nest in large and small open-fronted boxes.

To adapt the box for crevice nesting birds such as a tree creeper, the body is simply turned until only a narrow portion of the rectangular aperture is left uncovered, leaving an access slot for the bird.

As the body and sleeve are essentially a circular component (although the sleeve has a portion removed) they can be readily produced in plastics material by extrusion, although the plastics material will have to have weatherproof characteristics so that it does not degrade or split when left in the open air through all the seasons.

As between the body and sleeve there may be projections and recesses so that the body and sleeve semi-lock in the various positions when the box is adapted for the different types of birds. The apertures in the body are preferably located so that in a particular position of the body no aperture registers with the slot and access to the interior of the body is prevented. By this measure it can be seen that the box can be closed off until it is required to be used for the arrival in the locality of a particular bird.

The body is preferably removable completely from the sleeve by moving same axially thereof, so that the interior can be cleaned in a simple and effective manner. The sleeve dimensioning may be such and the material of the sleeve may be such that the sleeve grips the body resiliently so that it will not be readily disloged from the sleeve by predators such as foxes or squirrels. By selecting the material of the box it can be made resistant to woodpecker erosion.

In use the sleeve is attached to the tree or other fixture and remains with the tree or fixture, whilst the bodies are as mentioned above readily removable for cleaning.

In for example an area where a large number of boxes are used, they will be of the same size so that all sleeves and bodies are interfittable and it it therefore not necessary to return the same body to the same sleeve after the body has been removed and cleaned.

Adjustment of the bodies within the sleeves can be achieved in particularly effective and efficient manner simply by turning same and a warden who has responsibility of a large number of boxes can effect a large number of box adjustments in one day.

The cap or the upper part of the body may be provided with a slight overhang or canopy to prevent rain water from entering the access aperture in use at the particular time.

For the attachment of the nest box to its mounting, the present invention provides another inventive aspect, and provides that a mounting clip of yieldable resilient material is used, this clip being essentially a sleeve with a slot therein, much the same as the sleeve of the nest box, so that the clip can simply be sprung round a tree or tree branch. To achieve this the slot in the clip will be spread and then the clip will be forced over the branch.

In a particularly suitable arrangement, the clip is dimensioned to be sprung round a conventional domestic drain pipe.

The clip may be provided with a strengthening and fitting bar to the outside thereof and extending axially thereof which is cemented or welded thereto, or the clip may be cemented or welded directly to the sleeve receiving the nest box body. In fact the clip and sleeve may be extruded together as a single component.

As an additional means of fixing the sleeve and/or clip may be provided with apertures through which screws can be passed for screwing into a tree or branch.

The clip can be used in conjunction with conventional nest boxes by being screwed or otherwise secured thereto, just as the nest box according to the invention comprising sleeve and hollow body can be used without the clip, but clearly the clip and nest box in conjunction provide a particularly advantageous arrangement.

An embodiment of the invention will now be described, by way of example, with reference to the accompanying drawings, wherein.

Figure 1:
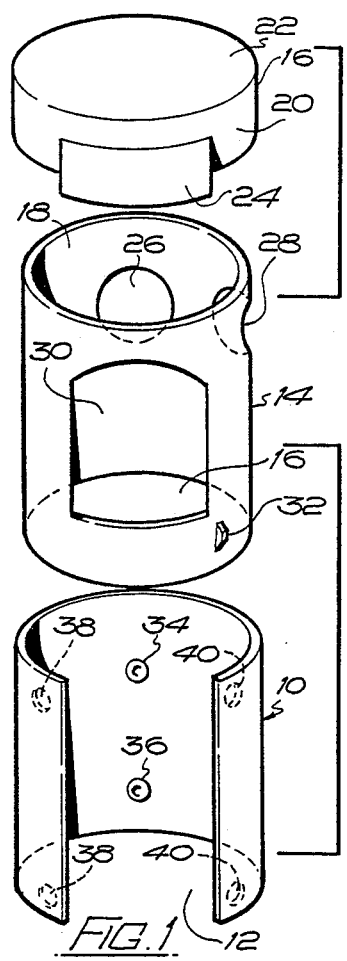
FIG. 1 is an exploded perspective view of a nest box according to one embodiment of the invention.

Referring to FIG. 1, the various components illustrated therein are formed in plastics material of appropriate weather resistant characteristics, and the components comprise a sleeve 10 which is cylindrical except for a cut-away slot 12, so that in fact the sleeve has a C-shaped cross section. The sleeve is adapted to receive a body comprising a body casing 14 and a cap 16 which in fact forms the nest box. The casing 14 is cylindrical and is closed at the bottom end by means of a base 16, whilst it is open at the top end 18. The cap is also cylindrical and comprises a flange 20 and a top 22. The cap is also shown as provided with a canopy 24, whose purpose will be explained.

The casing 14 is provided with three wall apertures 26, 28 and 30. The apertures 28 and 26 lie towards the top end of the casing 14 and aperture 28 is slightly smaller than aperture 26. Aperture 30 is generally rectangular and is formed in the wall of the casing as shown, and is considerably larger than either aperture 28 or 26.

Figure 8:
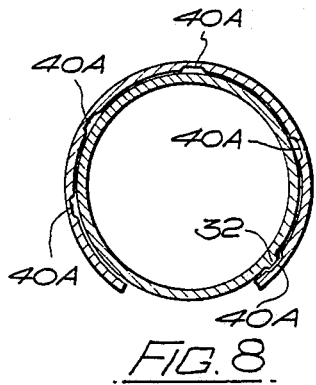
FIG. 8 is a sectional plan taken on the line Y—Y in FIG. 5.

On the exterior at the lower end thereof the casing is provided with a locating projection 32 which is received in any one of several recesses formed in the wall of the sleeve 10, as will be explained in relation to FIG. 8.

The sleeve 10 is shown as provided with fixing apertures 34 and 36 whereby the sleeve may be fastened to a tree or wall or the like by means of suitable screws passing through apertures 34, 36. Alternative aperture positions are indicated at 38 and 40 in dotted lines, if it is desired to mount the nest box facing to the left or to the right in relation to the fixing surface. Apertures 34 and 36 arrange for the box to face forwards.

Assembly of the nesting box and sleeve will be understood clearly from FIG. 1 in that the cap 16 closes the casing 14, and the casing and cap are received inside the sleeve 10. The body is received inside the sleeve 10 firmly but resiliently so that the body can be rotated within the sleeve to any one of a plurality of predetermined positions. These predetermined positions are defined as indicated in FIG. 8 by the location of the internal recesses 40A in the sleeve 10 and the receipt in said recesses of the said projection 32. When the projection 32 is in a recess 40, there is resistance to turning of the body, but that resistance can be overcome by applying sufficient torque. The positions defined by recesses 40 are illustrated in FIGS. 2 to 6 which show in front elevation the assembled nest box.

Figure 2:
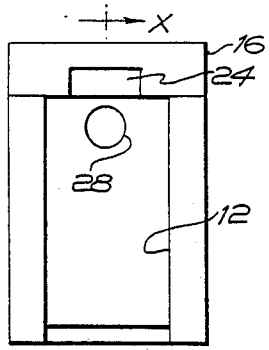
FIG. 2 shows the nest box of FIG. 1 in assembled condition and in front elevation, the body being in a first position.
Figure 3:
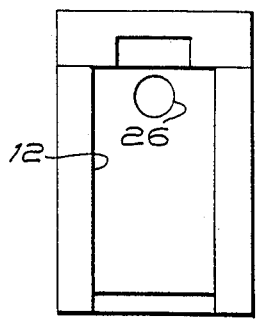
FIGS. 3 to 6 show respectively the nest box of FIG. 1 in assembled condition and in front elevation but in four further positions.

In the FIG. 2 position, the aperture 28 registers with the slot 12 so that small hole nesting birds can gain access to the interior of the nest box. In the arrangement of FIG. 3, the aperture 26 registers with the slot 12 enabling access to the interior of the nesting box by small and larger hole nesting birds.

Figure 4:
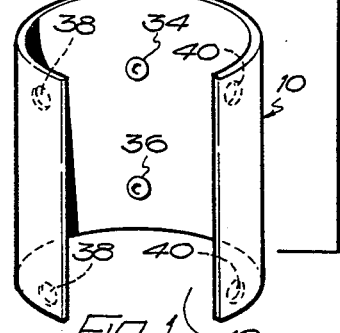

In the arrangement of FIG. 4, the large aperture 30 in the body registers with the slot 12 enabling the use of the nesting box by birds which nest in open-fronted boxes.

Figure 5:
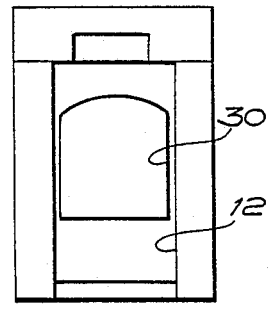

In the arrangement of FIG. 5, none of the apertures 26, 28 and 30 registers with the slot 12, and the box is therefore closed.

Figure 6:
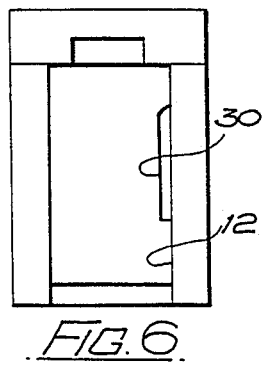
Figure 7:
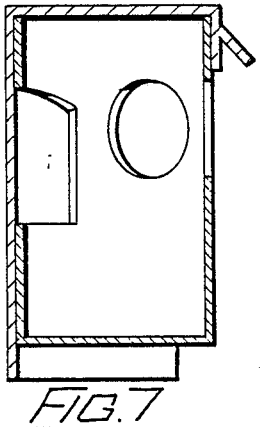
FIG. 7 is a sectional view taken on the line X—X in FIG. 2.

In the arrangement of FIG. 6, the aperture 30 only partially registers with the slot 12 whereby the nesting box is suitable for crevice nesting birds such as a tree creeper.

It will be appreciated that in the arrangement described, cap 16 must be rotated relative to the casing 14 to ensure that in all arrangements the canopy 24 overlies the slot 12 and therefore prevents rain water from entering the apertures 26, 28, 30.

Figure 8A:
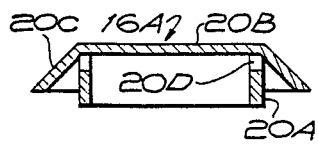
FIG. 8A is a sectional view of an alternative form of lid of the nest box.
Figure 8B:
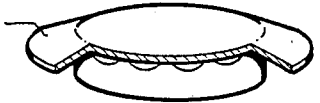
FIG. 8B is a perspective and partly cut away view of the lid shown in FIG. 8A.

Should it be necessary, the lid 16 as shown in FIGS. 1 to 8 may be provided with ventilation apertures in order to reduce the amount of condensation which collects in the nest box. An alternative form of lid design is shown in FIGS. 8A and 8B to provide such ventilation apertures and referring to these figures, the lid is indicated by reference 16A and it will be seen to comprise a cylindrical wall 20A depending from the underside of a top plate 20B, said top plate having a skirt 20C which is outwardly flared and serves the purpose of shedding rain water from the top of the box.

Where the wall 20A meets the plate 20B there are circumferentially spaced apertures 20D of curve or linear form as shown in FIG. 8B. These apertures provide for ventilation of the air in the nest box, and the skirt 20C serves the purpose of shedding water similar to the canopy 24 as shown in FIG. 1. The lid 16A again will be of plastics material component, and may be used with the embodiment of the nest box shown in FIG. 1 or any other embodiment of the invention.

Figure 9:
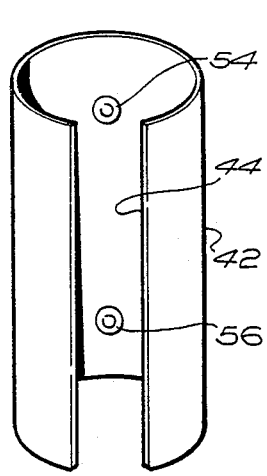
FIG. 9 is a perspective view of a mounting clip for a nest box, in accordance with the invention.
Figure 10:
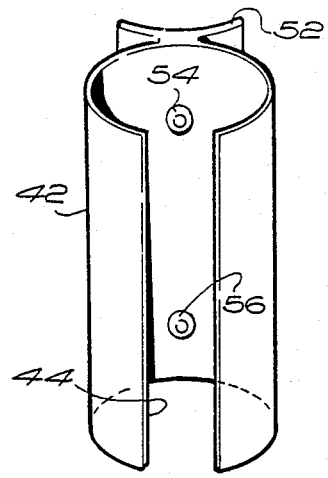
FIG. 10 is a view similar to FIG. 9 showing an alternative embodiment of mounting clip.
Figure 10A:
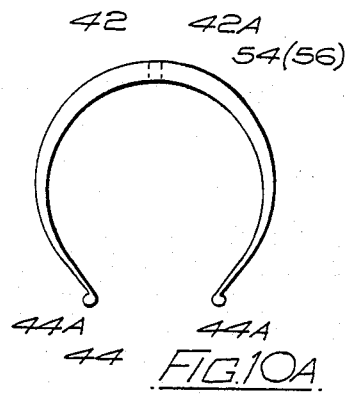
FIG. 10A shows a mounting clip according to another embodiment of the invention.
Figure 12:
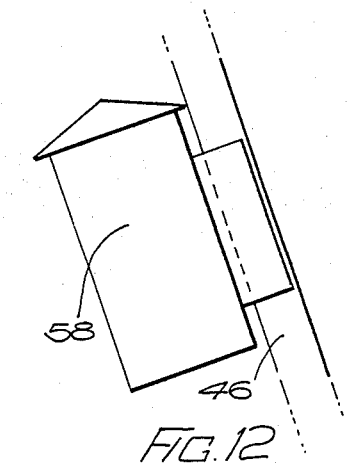
FIG. 12 shows in side elevation the nest box of FIG. 11 when mounted to a tree branch by means of the clip.
Figure 13:
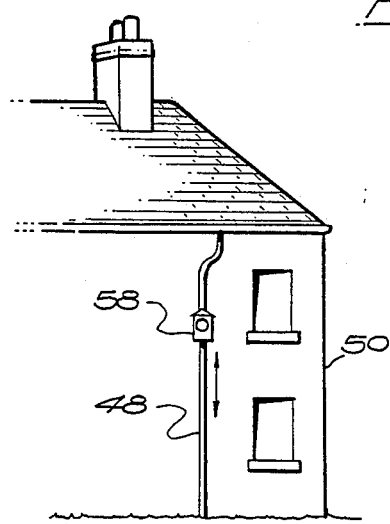
FIG. 13 shows the nest box of FIG. 11 when mounted on a rain water downpipe on a domestic dwelling.

The box according to FIGS. 1 to 8 may be mounted by mounting sleeve 10, but in an alternative embodiment of the invention, there is provided a mounting clip shown in FIGS. 9, 10 or 10A. This mounting clip comprises a sleeve 42 which is of cylindrical form and is provided with a spring slot 44 so that the sleeve can be clipped over a branch 46 as shown in FIG. 12, or a fall pipe 48 of a house 50 as shown in FIG. 13. The sleeve 42 will be appropriately dimensioned for this purpose.

In the FIG. 10 arrangement, the sleeve 42 is provided with an integral rigidifying bar 52 which may be formed with the clip 42 during extrusion of same or may be welded or cemented thereto.

The clip shown in FIG. 10A is similar to that shown in FIG. 9 except that at the rear of the clip i.e. opposite the opening 44 the clip is of thick insection as shown at 42A whereby its rear portion or "spine" to cracking and failure in the use of the clip as will explained.

Additionally, the extremeties of the clip defining the opening 44 have enlarged beads 44A to prevent such edges from splitting, cracking or chipping. The features of the clip of FIG. 10A can be embodied in any clip of the present invention.

Figure 10B:
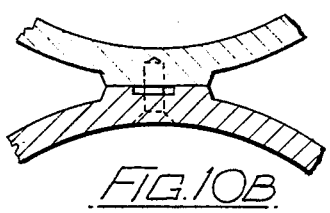
FIG. 10B shows a detail of another interpretation.

In the arrangement shown in FIG. 10B, the clip is the same as that of FIG. 10A except that two ridges 42B define a flat on which a thickened ridge 52A which abuts the flat defined by ridge 42B, all as shown clearly in FIG. 10B.

Figure 11:
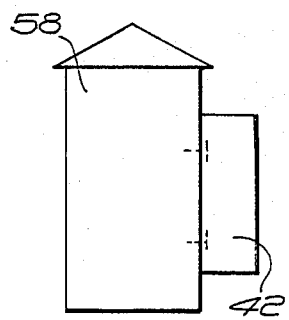
FIG. 11 shows a nest box with the clip of FIG. 9 attached thereto.

The clips shown in each of FIGS. 9, 10, 10A and 10B have facing apertures 54 and 56 which are countersunk holes to receive screws to enable the clip to be screwed to a bird nesting box such as a conventional timber nesting box 58 as shown in FIG. 11.

The clips shown in FIGS. 9, 10, 10A and 10B are of a resilient material so that slot 44 can be opened and sprung over a tree branch such as branch 46 or the pipe 48 as shown in FIGS. 12 and 13 respectively.

The clip of FIGS. 9, 10, 10A and 10B can be connected to a conventional nest box or a nest box according to the invention at any desired angle to suit the angle of the tree or pipe to which the clip is applied with the result that even although the tree, branch or pipe is lying at an angle to the vertical, by the use of the clip, and by appropriately angling same in relation to the nest box, the nest box can be disposed in vertical disposition, if desired.

Figure 14:
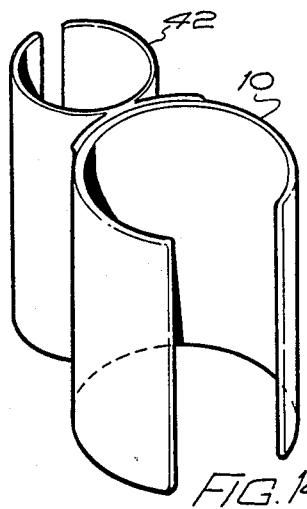
FIG. 14 shows in perspective view how the sleeve of FIG. 1 and the clip of FIG. 10 may be connected to provide a nest box holding assembly.

A particularly advantageous construction results if a clip as shown in FIG. 9, 10, 10A or 10B is used in conjunction with the sleeve 10 shown in FIG. 1, and FIG. 14 illustrates such an arrangement. The sleeve 10 is shown as is the clip 42. These are shown as being of the same length, but they need not be. Also the clip 42 is shown as being of smaller diameter than the sleeve 10, but again this is not necessary.

The clip 42 and sleeve 10 are shown as being welded or cemented together, but they could be formed as a single extrusion. In this case it is not necessary to provide any fixing apertures or fixing screws, as the clip 42 will serve for fixing of the nest box, whilst the sleeve 10 serves for receiving a nest box body as previously described in relation to FIGS. 1 to 8.

The advantages of the nest box according to the invention will be readily understood.

First, the nest box in being plastic can be made robust and durable. It can be made to drain easily by providing drainage apertures in the base 16 of the body 14, and it can also be ventilated as explained. The nest box will be more or less totally proofed against penetration by woodpeckers and squirrels. The box will not have the disadvantages associated with metal boxes if it is constructed in plastics material. The box is simple to fabricate, and if constructed of plastics material many, if not all of the components, can be formed by extrusion.

The mounting of the nest box using the clip eliminates the disadvantages of conventional mounting methods as recited herein. The nest box can easily be removed for cleaning and can readily be replaced.

The nest box can be adapted to be made suitable for a wide range of birds including crevice nesting birds such as the tree creeper.

The nest box can be blanked off by positioning the body as shown in FIG. 5 and only opened at the appropriate time, such as to coincide with the arrival of migrating birds, or to keep the young in the nest until they are of sufficient age.

The nest box according to the invention or a conventional nest box using a clip of the present invention can be mounted on the down pipe of a domestic drainage system, which is the safest place for a nest box as birds are relatively free of predators in this position. Indeed a nest box positioned on a downpipe using the clip according to the invention can be readily moved up and down, for example by means of a brush, as required.

By providing that the material used for the nest box sleeve, i.e. plastics material, has a smooth surface, this acts as a means inhibiting squirrels and other animals from raiding the nest, as such animals find it difficult to maintain a grip on the smooth plastics material.

The ability to close off all apertures prevents for example mice from nesting in the boxes during the winter months. Removal of mice nests is a considerable problem.

Many modifications of the basic concept of the invention may be made without departing from the scope thereof. For example the cap 16 could be permanently fixed by means of screws or welding or gluing. Instead of the nest body rotating, the sleeve may be adapted to rotate, whilst the nest body is the means serving to mount the nest box.

The free edges of the sleeve defining the slot 12 may be flared or outwardly turned in order to form a means for shedding rain water from the box. When screws are used for the fixing of the sleeve or clip, screws are preferably used in conjunction with soft plastic washers to prevent ingress of water through the screw apertures.

The interior surfaces of the nest box may be of rough texture enabling birds to grip the interior surfaces more easily.

The nest box may be provided with a ventilating slot to facilitate air circulation and prevent condensation.

Although plastics is it is believed the best material for these boxes, it is to be pointed out that it is not essential that plastics be used for each or any of the parts of the nesting box and/or clip.

The various components of the nesting box clip may be made of any colour or surface finish, in order to blend in with the surroundings in which the box will be used.

Any of the clips shown and described herein may have small apertures in the wall thereof and through which nails or pins can be driven for more securely holding the same to the trees in cases where the clip may not be a particularly tight fit on the tree.

The invention can be applied to boxes for other than birds. Thus, it can be used in connection with cat boxes.

What is claimed is:

1. A nesting arrangement for birds that includes the combination of
   (1) a sleeve member
      (a) which is C-shaped in cross section,
      (b) which has an open upper end, an open lower end,
      (c) which has an open slot extending from said upper end to said lower end,
      (d) which is composed of resilient material so that the width of said open slot can be widened by the application of force, and
      (e) which includes means positioned opposite said open slot for mounting said sleeve member on a support, and
   (2) a hollow housing for birds snugly within said sleeve member,
      (a) which has top, bottom and side walls,
      (b) which has its side walls dimensioned so that the housing will fit within and be held by said sleeve member, and
      (c) which contains at least two bird access apertures either of which can be placed in registry with said open slot in said sleeve member by rotating said hollow housing about its axis.

2. A nesting arrangement according to claim 1 wherein said hollow housing is circular in cross section and said sleeve is of complementary shape so as to allow said hollow housing to be turned within said sleeve.

3. A nesting arrangement according to claim 2 wherein said hollow housing includes drain means at the bottom thereof and ventilation means in the top thereof.

4. A nesting arrangement according to claim 1 wherein said bird access apertures include a first circular hole of small diameter for small nesting birds, a second and larger circular hole for larger nesting birds, and a third aperture in the form of a generally wide rectangular aperture of about the same width as said open slot in said sleeve member.

5. A nesting arrangement according to claim 1 wherein said sleeve member and said hollow housing have projections and recesses so that they may be semi-locked in any one of several positions relative to each other.

6. A nesting arrangement according to claim 1 wherein said sleeve member and said hollow housing are made of plastics material.

7. A nesting arrangement according to claim 1 which includes water sheding means located above said open slot of the sleeve so as to shed water away from any access aperture located in registry with said open portion.

8. A nesting arrangement according to claim 1 wherein said sleeve member is connected to a clip of yieldable resilient material, such clip comprising a second sleeve with a slot therein so that the clip can be resiliently deformed around a tree, tree branch or pipe.

9. A nesting arrangement according to claim 8 wherein the clip is provided with a strengthening and fitting bar.

10. A nesting arrangement according to claim 8 wherein the sleeve and clip are formed as a one-piece extrusion.

11. A nesting arrangement according to claim 8 wherein the clip is thicker in the region away from the slot than at the edges adjacent said slot.

* * * * *